(12) United States Patent
Morimoto et al.

(10) Patent No.: US 6,742,614 B2
(45) Date of Patent: Jun. 1, 2004

(54) CONTROLLER OF A HYBRID VEHICLE

(75) Inventors: Kazuhiko Morimoto, Hamamatsu (JP);
Yoshiaki Omata, Hamamatsu (JP)

(73) Assignee: Suzuki Motor Corporation,
Shizuoka-ken (JP)

( * ) Notice: Subject to any disclaimer, the term of this patent is extended or adjusted under 35 U.S.C. 154(b) by 137 days.

(21) Appl. No.: 10/101,300

(22) Filed: Mar. 19, 2002

(65) Prior Publication Data

US 2002/0134596 A1 Sep. 26, 2002

(30) Foreign Application Priority Data

Mar. 21, 2001 (JP) ........................... 2001-079842

(51) Int. Cl.⁷ ................................. B60K 6/00
(52) U.S. Cl. ..................................... 180/65.2
(58) Field of Search ............... 180/65.2, 65.3, 180/65.4; 123/339.19; 477/3; 290/40 C

(56) References Cited

U.S. PATENT DOCUMENTS

| | | | |
|---|---|---|---|
| 4,335,429 A | * | 6/1982 | Kawakatsu ............... 701/102 |
| 4,371,050 A | | 2/1983 | Ikeura |
| 5,012,779 A | * | 5/1991 | Fukui et al. ........... 123/339.11 |
| 5,343,970 A | | 9/1994 | Severinsky |
| 5,632,238 A | | 5/1997 | Furukawa et al. |
| 5,801,499 A | * | 9/1998 | Tsuzuki et al. ............. 318/141 |
| 5,839,533 A | | 11/1998 | Mikami et al. |
| 5,841,201 A | | 11/1998 | Tabata et al. |
| 5,895,333 A | | 4/1999 | Morisawa et al. |
| 5,934,396 A | * | 8/1999 | Kurita ........................ 180/65.2 |
| 5,935,040 A | | 8/1999 | Tabata et al. |
| 6,032,753 A | | 3/2000 | Yamazaki et al. |
| 6,109,237 A | | 8/2000 | Pels et al. |
| 6,114,775 A | | 9/2000 | Chung et al. |
| 6,176,807 B1 | | 1/2001 | Oba et al. |
| 6,234,932 B1 | | 5/2001 | Kuroda et al. |
| 6,307,277 B1 | * | 10/2001 | Tamai et al. ............... 290/40 C |
| 6,335,573 B1 | | 1/2002 | Eguchi et al. |
| 6,345,216 B1 | | 2/2002 | Morimoto et al. |
| 6,348,771 B1 | | 2/2002 | Morimoto et al. |
| 6,362,580 B1 | | 3/2002 | Omata et al. |
| 6,369,539 B1 | | 4/2002 | Morimoto et al. |
| 6,373,206 B1 | | 4/2002 | Morimoto et al. |
| 6,380,641 B2 | * | 4/2002 | Matsubara et al. ........ 290/40 C |
| 6,394,069 B1 | * | 5/2002 | Kondo .................. 123/339.19 |
| 6,443,126 B1 | | 9/2002 | Morimoto et al. |
| 6,573,614 B2 | * | 6/2003 | Doll ........................... 290/40 C |
| 2002/0109407 A1 | | 8/2002 | Morimoto et al. |

* cited by examiner

*Primary Examiner*—Frank Vanaman
(74) *Attorney, Agent, or Firm*—Flynn, Thiel, Boutell & Tanis, P.C.

(57) ABSTRACT

A controller controls a hybrid vehicle that has an internal combustion engine and an electric motor that assists the engine. In fuel cut control during vehicle deceleration, the controller sets a return engine speed at a value that inevitably stalls the engine. However, the motor executes power assist-control so that engine speed is maintained, engine stall does not occur, and the engine speed smoothly converges at an idle speed. Thus, the engine speed is set at a lower value, so that fuel cut is executed for as long as possible.

13 Claims, 5 Drawing Sheets

OPERATION AT RETURN ENGINE SPEED SLOWER (WITH ASSIST)

OPERATION IN ENGINE FREE BY CLUTCH DISENGAGE

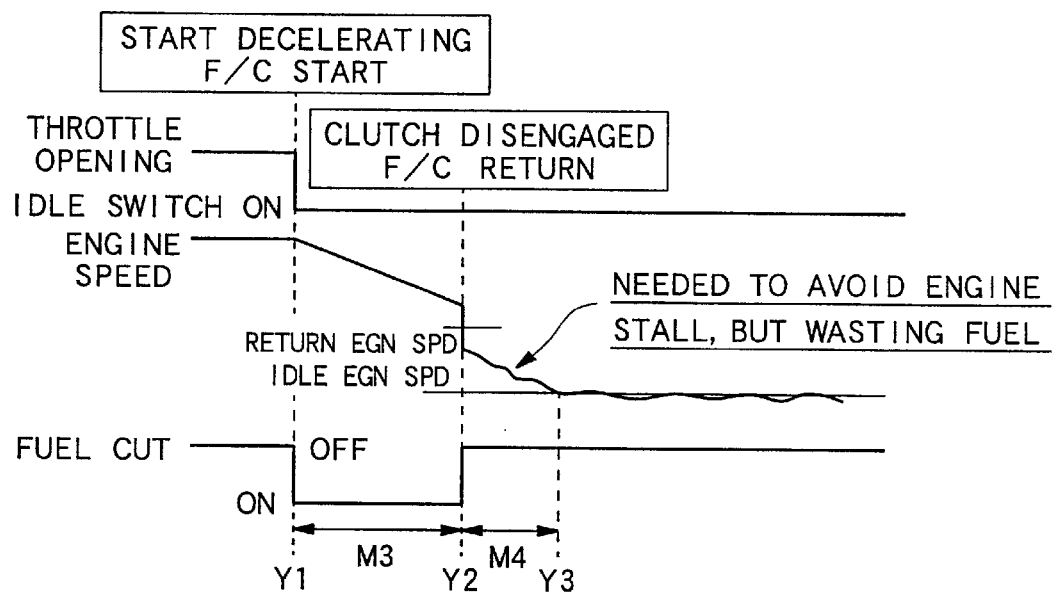

CONTROLLER OF A HYBRID VEHICLE

FIELD OF THE INVENTION

The invention relates to a controller of a hybrid vehicle, which can execute fuel cut during vehicle deceleration for as long as possible and which smoothly switches the engine to an idle-driving state.

BACKGROUND OF THE INVENTION

A vehicle is equipped with a fuel-cut controller in which fuel supply to an engine is interrupted when a condition for fuel cut execution is met during deceleration of the vehicle, and in which the fuel supply to the engine is returned by lifting the fuel cut when the engine speed drops to a predetermined return engine speed, reducing the unburned gas and fuel consumption during deceleration.

Some motor vehicles are of a type commonly called a hybrid vehicle having an internal combustion engine driven by combustion of fuel and an electric motor (hereinafter referred to as "motor") driven by electric energy, the motor being directly connected to the engine and also having a power-generating function. The hybrid vehicle is equipped with: an engine; a motor directly connected to an output shaft of the engine; an engine controller for controlling the operating state of the engine; and an assistive motor controller to control operating states of the motor. The engine and motor controllers detect the operating states of the engine and the motor respectively, which are controlled in association with one another. Such a control system attains a high level of required performance (such as fuel efficiency, lower values of detrimental components in exhaust gases, and power performance). The motor controller is connected to the battery which supplies the motor with electric power and is charged by electric power from the motor.

Such a controller of a hybrid vehicle is disclosed in Japanese Patent Laid-Open No. 10-23604 which controls the motor to be driven to assist the engine for prevention of engine stall when engine speed is equal to or less than a predetermined value and the amount of change in engine speed is decreasing during vehicle driving.

However, in a conventional fuel cut control, as shown in FIG. 7, fuel supply to the engine is interrupted (cut) by starting a fuel cut control when a throttle opening is small and an idle switch is turned on in the decelerating state (see time X1). Then the fuel supply is cut for a predetermined period (M1) until engine speed drops, with engine remaining braking, to an engine speed for return (see time X2). Then the fuel supply is restarted by stopping the fuel cut control when the engine speed drops to the return engine speed. This return engine speed is usually set at a value ranging from 1300 to 1500 rpm. After engine speed drops to the return engine speed shown at time X2, the vehicle is decelerating while consuming fuel. Then after a predetermined time (M2) when the clutch is disengaged or the transmission is in a neutral position shown at time X3, engine speed converges at an idle engine speed.

On the other hand, as shown in FIG. 8, fuel supply to the engine is prevented (cut) by executing a fuel cut control when the throttle opening is less and an idle switch is turned on in the decelerating state (see time Y1). Also, when the engine is in a free state by clutch disengagement (see time Y2) after a predetermined time period (M3) during engine braking, then the engine speed drops to less than the return engine speed, so that the fuel supply is restarted by stopping the fuel cut control. Then after a predetermined time period (M4), when engine speed is gradually decreased (time Y3), engine speed converges at an idle engine speed.

However, the return engine speed needs to be set at a certain value such that fuel supply restarts at an early stage after fuel cut is executed, which otherwise brings engine stall even if fuel supply is restarted. On this account, the return engine speed needs to be set at a comparatively high speed having rather much margin (value), resulting in less fuel consumption improvement.

In addition, the above prevention arrangement intends to assist the engine before engine stall for some reason, which thus cannot continue fuel cut during vehicle deceleration for as long as possible.

SUMMARY OF THE INVENTION

In order to obviate or at least minimize the above use of fuel during vehicle deceleration, the present invention provides a control system for a hybrid vehicle having an internal combustion engine, a motor, and a battery. The motor is connected to the output shaft of the engine and has driving and power generating functions. The battery is connected to the motor. The control system includes: a deceleration detector to detect deceleration of the vehicle, a fuel cut control device for executing fuel cut control, means for stopping fuel supply to the engine when a fuel cut executing condition is met while the vehicle is decelerating, and restarting the fuel supply to the engine by canceling the fuel cut control when engine speed drops to a predetermined return engine speed. An assist controller drives the motor to execute assist control when engine speed drops to less than the return engine speed.

In the fuel cut control device during vehicle deceleration of the present invention, at engine side, a return engine speed is set to a speed in which the engine inevitably stalls, which is the engine speed set as low as possible, so that fuel cut is executed as long as possible to improve fuel consumption. Also at motor side, assist-control is executed such that engine speed is maintained so that engine stall does not occur, so that the engine speed converges at an idle speed smoothly without any detectable uncomfortable feeling.

BRIEF DESCRIPTION OF THE DRAWINGS

FIG. 8 is a time chart of conventional control of the motor when the clutch is disengaged with engine brake.

DETAILED DESCRIPTION

Figure 1:
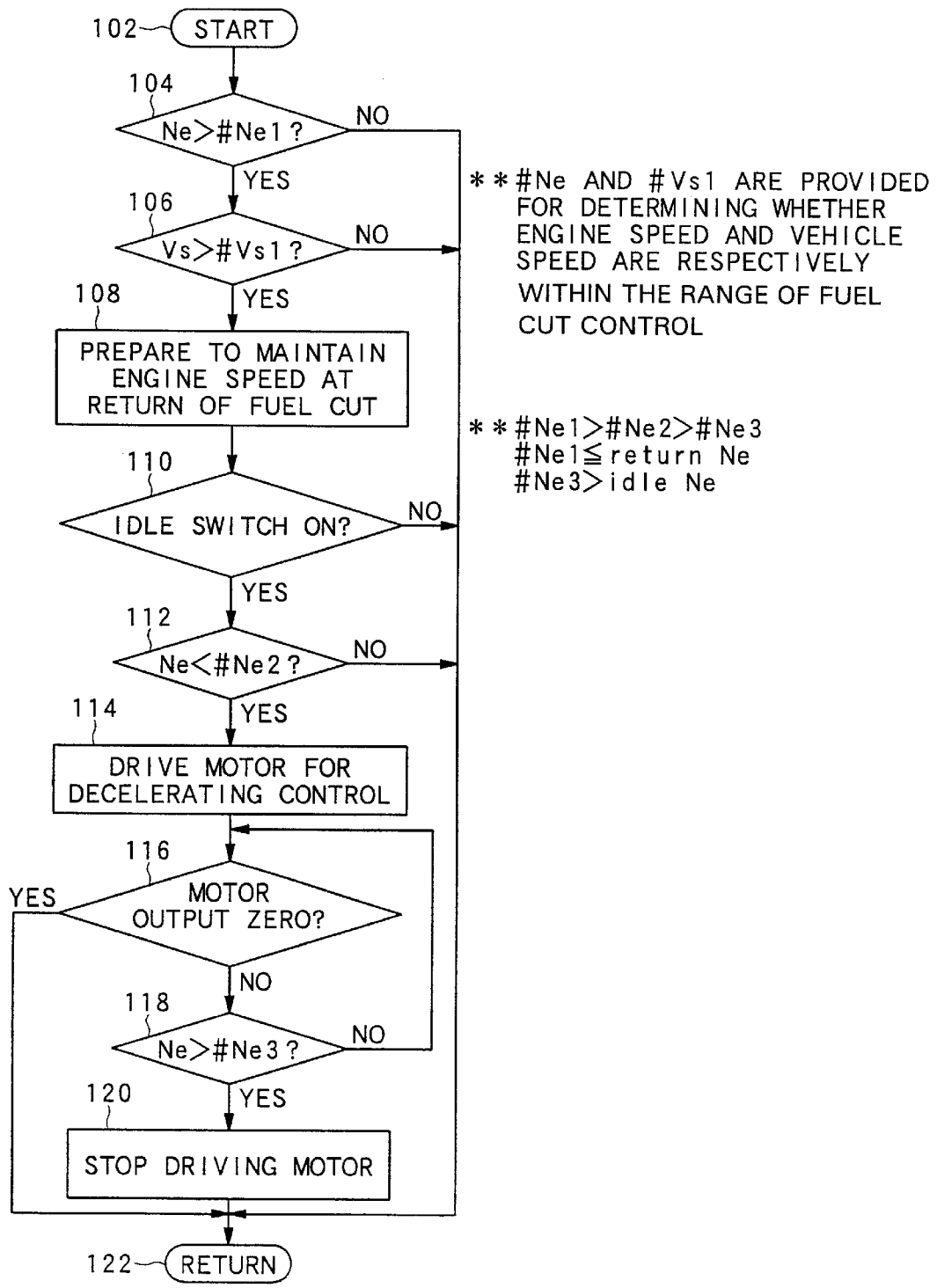
FIG. 1 is a flow chart for control of a motor.

The present invention will now be described in specific detail with reference to FIGS. 1–6 which illustrate an embodiment of this invention. Referring to FIG. 5, a hybrid vehicle 2 (hereinafter referred to as "vehicle") includes: an internal combustion engine 4 driven by fuel combustion; a transmission 6; clutch 8 disposed between the engine 4 and the transmission 6 for transmission/cut-off of the engine output; a motor 10 disposed between the engine 2 and the clutch 8 and connected to an output axle (not shown) of the engine 2, the motor having driving and power generating functions; and a control system 12 of the vehicle.

The control system 12 includes: an engine controller 14 connected to the engine 4 for controlling the operating state of the engine; an assistive motor controller 16 connected to the motor 10 for controlling the operating state of the motor 10; and a fuel cut (F/C) control device 18 for interrupting fuel supply during deceleration of the vehicle 2.

In addition, the control system 12 of the vehicle is connected to an idle switch 20 for detecting deceleration of the vehicle 2, an engine speed sensor 22 for detecting engine speed (Ne), a vehicle speed sensor 24 for detecting vehicle speed (Vs), a throttle opening sensor 26 for detecting throttle opening degree, and a gear position switch 28 for detecting gear position of the transmission 6.

The motor controller 16 is connected to a battery 30 which supplies the motor 10 with driving power and which is charged by the power that motor 10 generates.

Fuel supply to the engine is interrupted (cut) by the fuel cut control device 18 only when a predetermined fuel cut execution condition is met during deceleration of vehicle 2, for example, when idle switch 20 is turned on. Also, fuel supply to engine 4 is restarted by the fuel cut control device 18 when engine speed (Ne) drops to a set return engine speed (return Ne).

Figure 2:
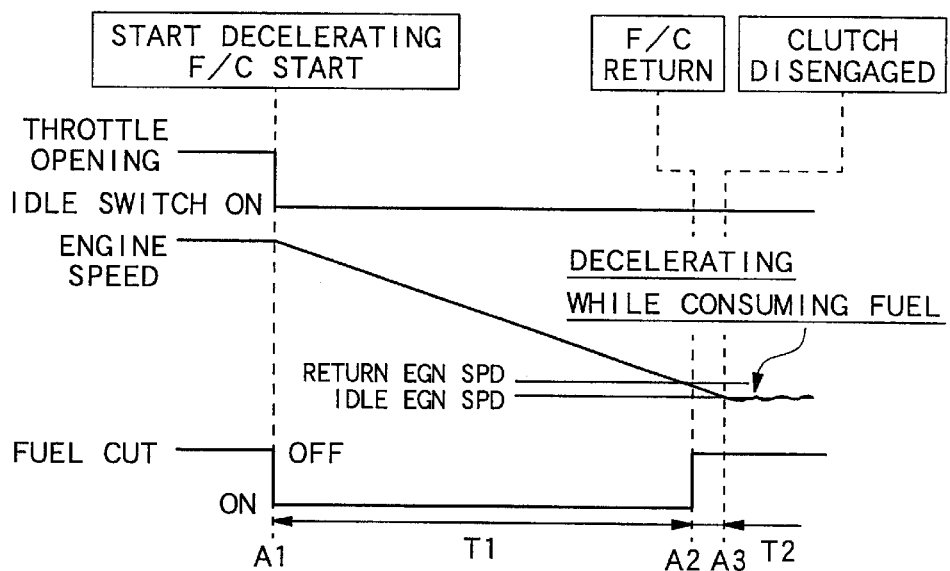
FIG. 2 is a time chart showing control of the motor.
Figure 3:
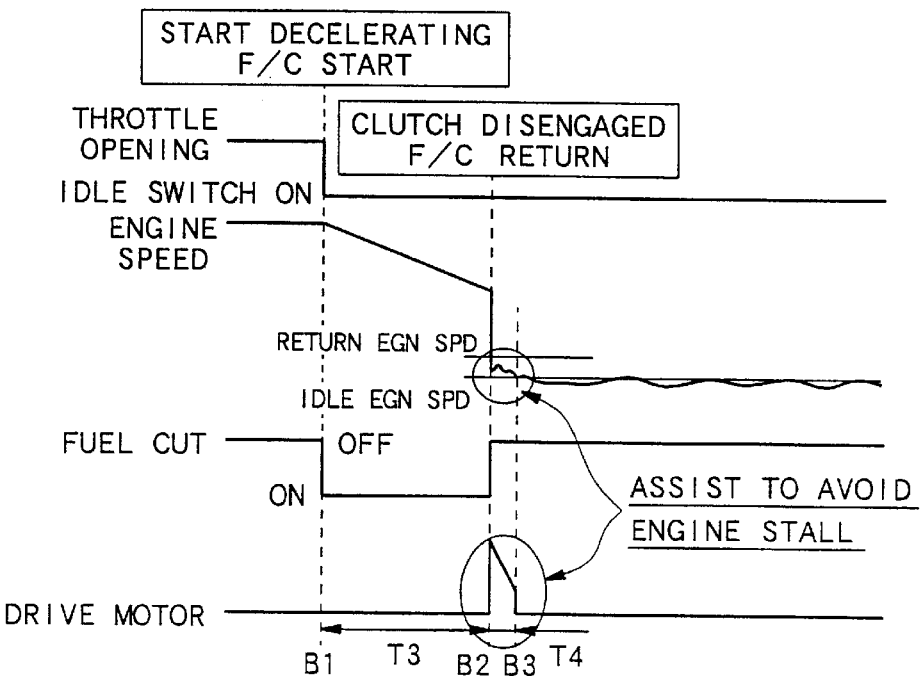
FIG. 3 is a time chart showing control of the motor when the clutch is disengaged with engine brake.

Conventional return engine speed is set at a value ranging from 1300 to 1500 rpm, while in this embodiment, as shown in FIGS. 2 and 3 for example, the return engine speed is set at slower than 1000 rpm and at a slightly faster speed than that of an idling internal combustion engine 2 (such as 900 rpm). The return engine speed can be changed according to the state of the battery 30.

Figure 4:
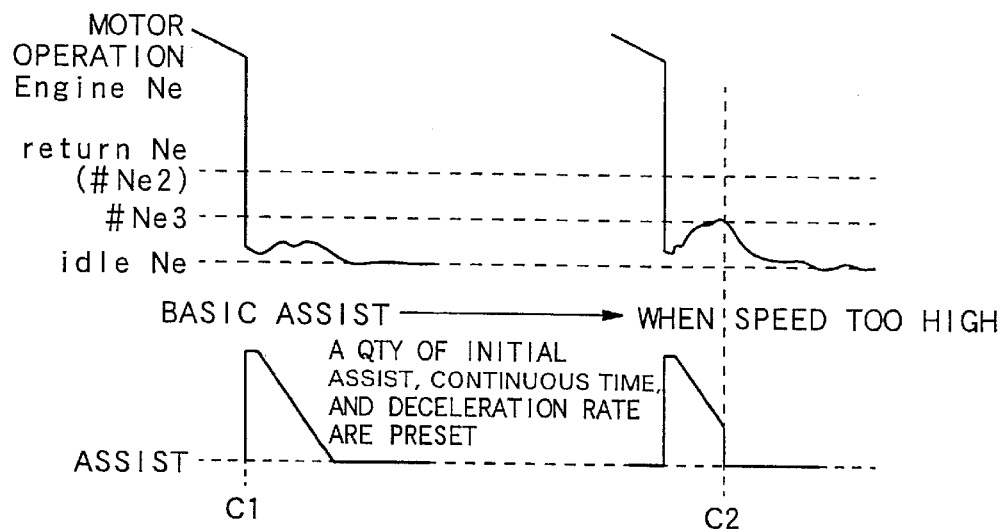
FIG. 4 is a time chart showing the state of motor driving.
Figure 5:
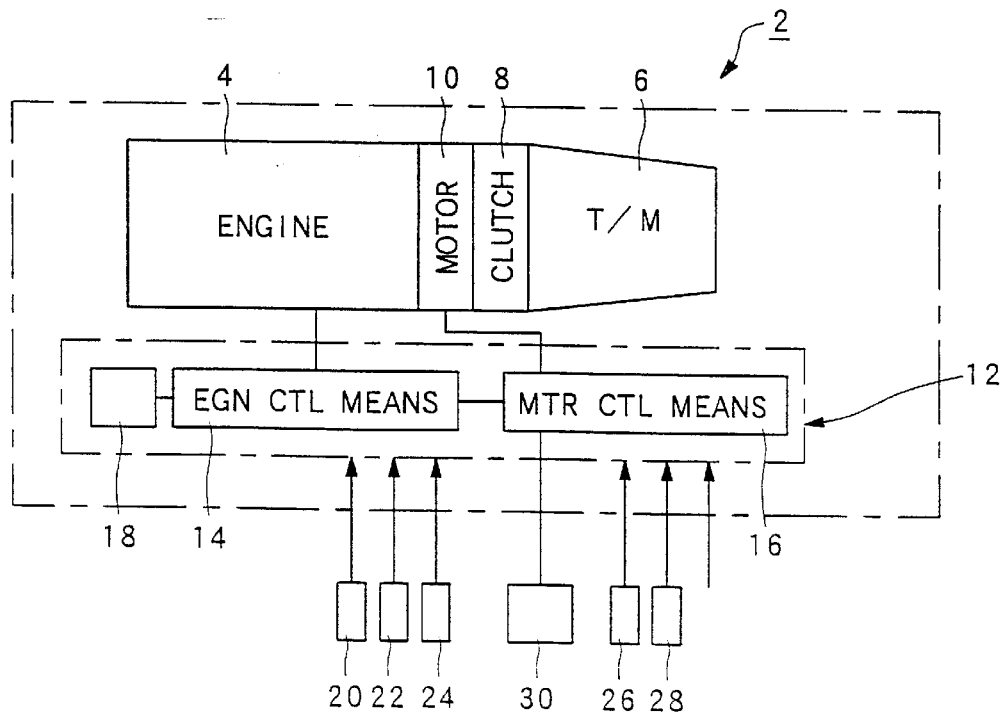
FIG. 5 is a block-diagram of a hybrid vehicle.

A quantity of initial assist, continuous time, and deceleration rate are preset for the motor controller 16 to control drive of the motor 10, as shown in FIG. 4. The motor 10 is driven by the motor controller 16 to execute a basic assist control when an engine speed (Engine Ne in FIG. 4) drops to less than a set engine speed (#Ne3) between a return engine speed (return Ne) (return Ne≦#Ne2) and an idle engine speed (Ne) (time C1), which permits engine speed (Ne) to converge at an idle speed. The motor 10 stops driving when the engine speed (Ne) reaches from the speed between the return engine speed and the idle engine speed to a set speed (#Ne3), which permits engine speed to converge at the idle speed. That is, the motor controller 16 controls the motor 10 to drive to execute assist control when the engine speed (Ne) decreases below the return engine speed (return Ne), and also controls the motor 10 to stop the assist-control when the engine speed is more than the set speed (#Ne3) which is set at less than the return engine speed (return Ne) and more than the idle engine speed (idle Ne). In addition, the motor controller 16 has a critical speed (#Ne1 in FIG. 1) and a critical vehicle speed (Vs1). The criterion of engine speed (Ne1) is provided for a determination whether the engine speed is within the range of fuel cut control, and the criterion of vehicle speed (Vs1) is for a determination whether the vehicle speed is within the range of fuel-cut control. The values are set such that "#Ne1>#Ne2>#Ne3", "#Ne2≦return Ne", and "Ne3>idle Ne" respectively.

Operation of the embodiment will now be described with reference to a flowchart in FIG. 1.

The program for the control system 12 starts at step 102. Then a determination is made at step 104 as to whether the engine speed (Ne) exceeds the critical engine speed (#Ne1), that is Ne>#Ne1.

When the determination at step 104 is "YES", then the engine speed is within the range of fuel cut control, and a determination is made at step 106 as to whether the vehicle speed (Vs) exceeds the critical vehicle speed (Vs1), that is Vs>#Vs1. If so, fuel cut occurs.

Further, when the determination at step 106 is "YES", then the vehicle speed is within the range of fuel cut control, and a control for maintaining engine speed at fuel cut return is prepared at step 108.

A determination is made at step 110 as to whether the idle switch 20 is on. If the determination at step 110 is "YES", then a determination is made at step 112 as to whether the vehicle 2 is decelerating and Ne is less than #Ne2.

If the determination at step 112 is "YES", then the motor 10 is switched to drive for decelerating control at step 114.

Then, a determination is made at step 116 as to whether the motor 10 output is at zero. When the determination in step 116 is "NO", then a determination is made at step 118 as to whether the engine speed (Ne) exceeds a set engine speed (#Ne3), that is Ne>#Ne3.

If the determination at step 118 is "NO", then the routine is returned to step 114.

If determination at step 118 is "YES", then the engine speed (Ne) has reached the set speed (#Ne3), so that the motor 10 is stopped driving at step 120, and the routine is returned at step 122.

When the determination at any of steps 104, 106, 110, and 112 is "NO", or at 116 is "YES", then the routine is returned to step 122.

Operation of the control of motor 10 will now be described in reference to a time chart shown in FIGS. 2 and 3.

Figure 7:
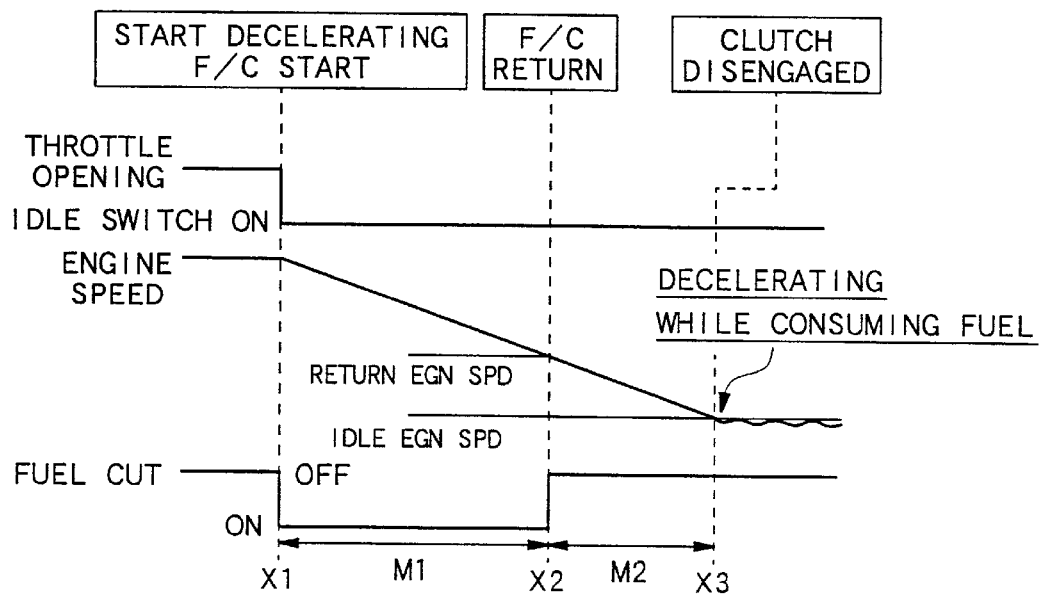
FIG. 7 is a time chart of a conventional fuel cut/return control.

Referring to FIG. 2, the fuel cut control device is started when the throttle opening is small and the idle switch 20 is turned on to decelerate the vehicle 2 (time A1). Fuel supply to the engine is interrupted (cut) by executing the fuel cut control until the engine speed drops to the return engine speed with the engine brake kept (time A2, period T1). When the engine speed drops to the return engine speed shown at time A2, then the fuel supply to the engine is returned by stopping the fuel cut control, and the motor 10 starts to drive. This return engine speed is conventionally set at value ranging from 1300 to 1500 rpm. The return engine speed of the present invention is, however, set below 1000 rpm so that the execution time T1 of fuel cut control is longer than that of a conventional system (see M1 in FIG. 7). Then, the vehicle is decelerating while consuming fuel after the engine speed drops to the return engine speed (time A2) and the engine speed smoothly converges at idle engine speed when the clutch is disengaged after the time period T2 (time A3).

On the other hand, now referring to FIG. 3, the fuel cut control is started when the throttle opening is small and the idle switch 20 is turned on to decelerate the vehicle 2 (time B1). Fuel supply to the engine is returned by stopping the fuel cut control device after a predetermined period T3 with the engine brake kept when the clutch 8 is disengaged to permit the engine to be in a free state (time B2). At the same time, the motor 10 is driven for a predetermined time T4 to assist the engine to not stall (assist-control). Then the engine speed converges at the idle engine speed.

Figure 6:
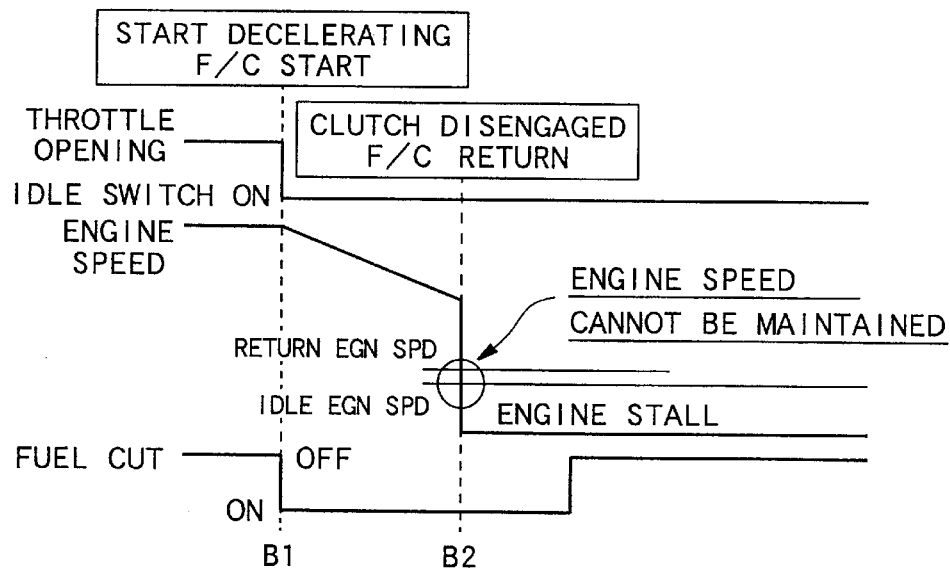
FIG. 6 is a time chart without assist-control of the motor.

However, as shown in FIG. 6, without this assist-control the engine stalls when the engine is in a free state by disengagement of clutch 8 (time B2) and is not able to maintain speed thereof.

As a result, in the fuel cut control during deceleration of the vehicle 2, at engine 4 side, a return engine speed (return Ne) is set at a speed at which the engine inevitably stalls. The return engine speed thus is set as low as possible so that fuel cut is executed as long as possible to improve fuel consumption effect. Also at motor 10 side, assist-control is executed such that engine speed (Ne) is maintained in which engine stall does not occur, so that engine speed converges at an idle speed smoothly without any perceived uncomfortable feeling or sensation.

In addition, the motor controller 16 controls the motor 10 to stop assist-control when the engine speed (Ne) exceeds the set speed (#Ne3) which is set lower than the return engine speed (return Ne) and higher than the idle engine speed. The assist-control is thus stopped as soon as the engine speed (Ne) is increased to an engine speed at which engine stall does not occur. This reduces consumption of battery 30 consumed by assist-control to the minimum necessary to stabilize the system and thus increase product quality and fuel efficiency.

The fuel cut controller 18 changes the return engine speed (return Ne) according to the condition of battery 30, which permits the return engine speed (return Ne) returning from the fuel cut to set a higher value when the battery 30 condition is not good. Accordingly, the battery is not drained more than needed, improving system stability and product quality.

That is to say, according to this embodiment, the fuel supply is interrupted when the idle switch 20 is turned on to decelerate the vehicle 2, and fuel supply is returned (restarted) when the engine speed (Ne) drops to the return engine speed (return Ne) with engine brake kept. At this time, the return engine speed (return Ne) is set not at a conventional value ranging from 1300 to 1500 rpm but at less than 1000 rpm, which enables longer executing time of fuel cut to reduce fuel consumption.

Also, in case clutch 8 is disengaged or the transmission 6 is in neutral during deceleration of the vehicle 2, even fuel supply to engine 4 is returned, the engine speed (Ne) is not maintained with the return engine speed (return Ne) of less than 1000 rpm, which is about to cause engine stall. According to the present invention, however, the motor 10 is driven for the assist-control such that engine speed is maintained at an engine speed slightly lower than the return engine speed (return Ne) which is set lower than in a conventional system. This arrangement stabilizes the state of combustion of engine 4 and permits a dropping velocity (change of velocity) of engine speed to be at zero, thereby keeping the engine rotating by itself.

In addition, after assist-control is executed for a necessary time to stabilize engine 4, the motor 10 is brought to have torque (output) of zero. Thereby, the motor 10 drives at a minimum speed so that battery power drain can be prevented.

Furthermore, in case the battery does not have the necessary charge level, assist-control of the motor 10 is interrupted to prevent further drain of the battery and the return engine speed is changed to the conventional value in which engine stall may not occur without the motor.

Accordingly, fuel cut during deceleration of vehicle 2 is executed as long as possible, engine stall can be prevented, and the vehicle 2 can be driven as usual, even if the battery 30 is exhausted.

Incidentally, the present invention can be applied not only to the hybrid vehicle but to a vehicle comprising a starter-generator as a motor for starting the engine and power generating. Also, a simplified hybrid vehicle can be a mainstream apparatus if the 36 volt system battery is realized.

In addition, assist-control of the motor can be changed according to the amount of vehicle deceleration. For example, when the vehicle is in sudden deceleration, the motor can be driven sooner before the engine speed drops to the return engine speed so that engine stall owing to decrease in engine speed can be prevented. On the other hand, when vehicle is decelerating gradually, the motor can be driven after the engine speed drops to the return engine speed so that fuel consumption can be improved.

The control system 12 can include one or more computers, microprocessor devices, or the like, to execute the disclosed sensing and control steps.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A control system for a hybrid vehicle having an internal combustion engine, a motor, and a battery, said motor being connected to an output shaft of said engine and having driving and power generating functions, said battery being connected to said motor, said control system comprising:

a deceleration detector for detecting deceleration of said vehicle;

a fuel cut control device for executing fuel cut control, said fuel cut control device stopping fuel supply to said engine when a fuel cut executing condition is met during vehicle deceleration, and restarting said fuel supply to said engine by canceling the fuel cut when an engine speed drops to a predetermined return engine speed; and a power assist controller to drive said motor to execute power assist control when the engine speed drops to less than said return engine speed.

2. The control system according to claim 1, wherein said power assist controller interrupts the power assist control of said motor when, after decreasing below a predetermined engine speed which is set lower than said return engine speed and faster than that for idling the international combustion engine, said engine speed increases to the predetermined engine speed.

3. The control system according to claim 1, wherein said control system varies said return engine speed according to a state of said battery.

4. The control system according to claim 1, wherein said power assist controller has preset therein values of initial assist, continuous time, and deceleration rate.

5. The control system according to claim 1, wherein said power assist controller interrupts the power assist control of said motor when said battery does not have a sufficient charge to function.

6. The control system according to claim 1, wherein the return engine speed is less than 1000 revolutions per minute.

7. The control system according to claim 1, wherein said control system varies a value for the return engine speed according to a rate of the deceleration of said vehicle.

8. A control system for a hybrid vehicle having an internal combustion engine and a motor, said motor being connected to an output shaft of said engine and having driving and power generating functions, and a battery connected to said motor, comprising:

a deceleration detector for detecting deceleration of said vehicle;

a fuel cut control device for executing fuel cut control, said fuel cut control stopping fuel supply to said engine when a fuel cut executing condition is met during vehicle deceleration, and restarting said fuel supply to said engine by canceling the fuel cut when engine speed drops to a return engine speed or by canceling the fuel cut when a clutch of said hybrid vehicle is disengaged; and a power assist controller to drive said motor to execute power assist control by applying a rotative force to the output shaft of the engine when the engine speed is less than the return engine speed or the clutch is disengaged to avoid vehicle engine stall, wherein said power assist controller cancels driving of the motor when the engine speed stabilizes at an engine idle speed, which is less than the return engine speed.

9. The control system according to claim 8, wherein said control system increases a set value for the return engine speed when said battery cannot power said power assist controller to drive said motor.

10. The control system according to claim 8, wherein said control system includes a predetermined engine speed which is less than the return engine speed and greater than the engine idle speed, wherein, when the engine speed decreases below the predetermined engine speed during deceleration and then increases to the predetermined engine speed while deceleration continues, the power assist controller discontinues driving of said motor to prevent unnecessary use of energy from said battery.

11. The control system according to claim 8, wherein the return engine speed is less than 1000 revolutions per minute.

12. The control system according to claim 8, wherein said control system varies said return engine speed according to a rate of the deceleration of said vehicle.

13. The control system according to claim 8, wherein said power assist controller drives the motor before the engine speed reaches said return engine speed during a sudden deceleration of said vehicle.

* * * * *